July 11, 1967     J. V. FOSTER ET AL     3,331,038
STEPPING RELAY WITH TWO ELECTROMAGNETIC ACTUATORS Filed Dec. 27, 1965     3 Sheets-Sheet 1

INVENTORS
Jack V. Foster &
Paul A. Hanold

BY *Arnold & Roylance*

ATTORNEYS

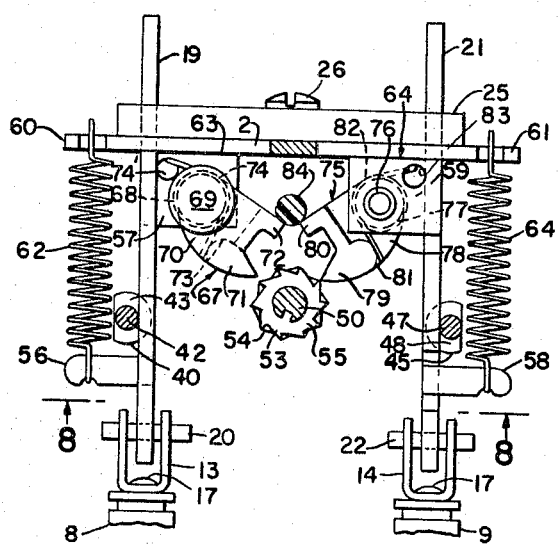
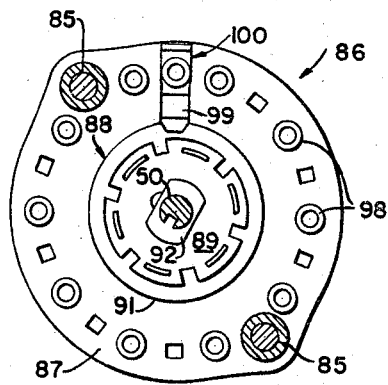
FIG. 5.
FIG. 6.
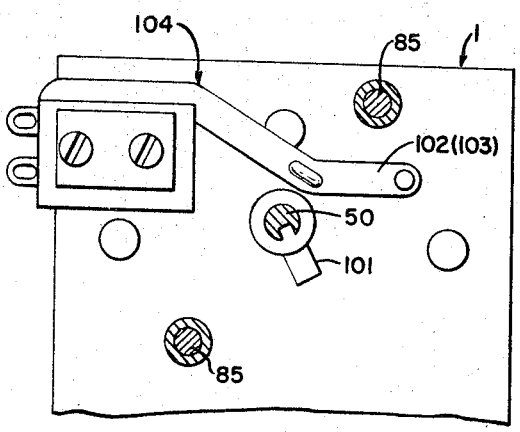
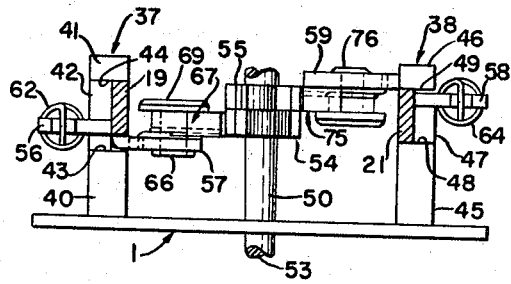
FIG. 7.
FIG. 8.
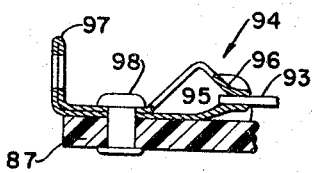
FIG. 10.
INVENTORS
Jack V. Foster &
Paul A. Hanold
BY *Arnold & Roylance*
ATTORNEYS July 11, 1967  J. V. FOSTER ET AL  3,331,038
STEPPING RELAY WITH TWO ELECTROMAGNETIC ACTUATORS
Filed Dec. 27, 1965  3 Sheets-Sheet 3

INVENTORS
Jack V. Foster &
Paul A. Hanold
BY
ATTORNEYS

United States Patent Office 3,331,038
Patented July 11, 1967

3,331,038
STEPPING RELAY WITH TWO ELECTRO-
MAGNETIC ACTUATORS
Jack V. Foster and Paul Alexander Hanold, Fort Branch, Ind., assignors to American Machine & Foundry Company, a corporation of New Jersey
Filed Dec. 27, 1965, Ser. No. 516,596
18 Claims. (Cl. 335—123)

This invention relates to electrical switching devices, particularly bi-directional, electromagnetically operated stepping switches.

Numerous bi-directional stepping switches have been proposed by prior-art workers, and such devices have achieved considerable success in commercial applications where a relatively expensive, frequently quite intricate, structure is justified. However, there has been a continuing need for a bi-directional stepping switch which would provide positive operation, yet would be substantially less expensive, simpler and more compact than the stepping switches heretofore proposed.

A general object of this invention is to provide such a stepper switch, and particularly to achieve the necessary positive switching operation even when employing a motor device operated by A.C.

Another object is to devise a highly simplified, inexpensive bi-directional stepping switch capable of selective operation in either direction and which also can be operated manually.

A further object is to provide such a device which requires a minimum of adjustment.

Yet another object is to devise a bi-directional stepping switch of the pawl and ratchet type which can be successfully operated without detents.

In order that the manner in which the foregoing and other objects are achieved in accordance with the invention can be understood in detail, one advantageous embodiment of the invention will be described with reference to the accompanying drawings which form a part of this specification and wherein:

FIGS. 5–7 are detail sectional views, with some parts shown in elevation, taken on lines 5—5, 6—6, and 7—7, FIG. 2, respectively;

FIG. 8 is a similar view taken on line 8—8, FIG. 5;

FIG. 10 is an enlarged fragmentary sectional view taken on a plane through the blade of the contact ring and the contact which it engages as shown in FIG. 3;

Figure 1:
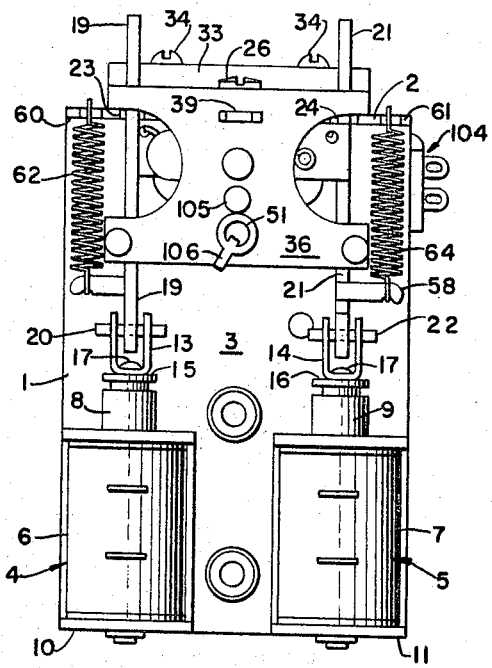
FIGS. 1–4 are front, side, rear and top plan elevational views, respectively, of a stepper switch.
Figure 2:
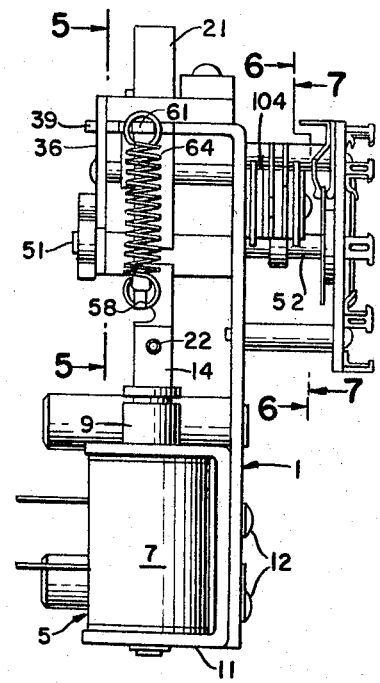
Figure 3:
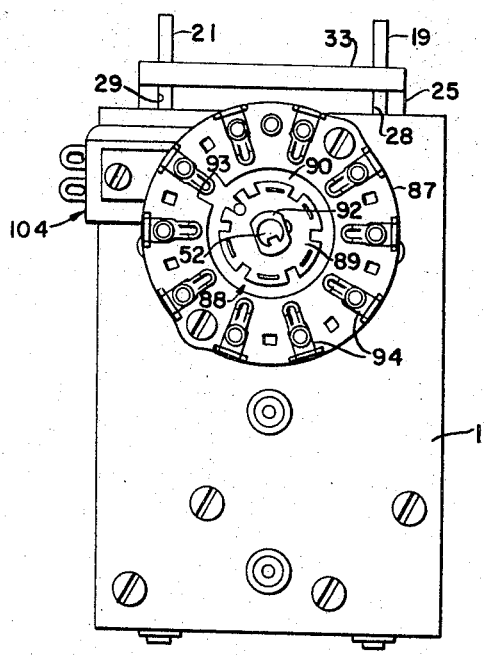

The illustrated embodiment of the invention comprises a flat metal frame plate 1 of elongated rectangular configuration, bent at one end to provide a flange 2 extending at right angles away from side surface 3. Two identical conventional electromagnetic motors 4 and 5 are employed, comprising solenoid windings 6, 7 and plungers 8, 9, respectively. Motors 4, 5 are mounted on surface 3 of plate 1 in side-by-side relation by U-shaped brackets 10, 11, respectively, the base of the U of each bracket being secured to the plate, as by screws 12. Plungers 8, 9 are parallel to each other and to surface 3.

Clevises 13, 14 have their base portions rigidly secured to the transverse end faces 15, 16 of plungers 8, 9, respectively, as by screws 17, 18. A flat elongated rectangular metal actuating member 19 is connected to clevis 13 by a pin 20 fixed rigidly to the member 19 and projecting through aligned bearing openings in the clevis arm. A flat elongated rectangular metal actuating member 21 is similarly connected to clevis 14 by pin 22. Flange 2 is provided with two rectangular notches 23, 24, FIG. 1, each notch being aligned longitudinally with a different one of plungers 8, 9. Member 19 extends freely through notch 23, without engaging the flange.

Secured to flange 2, on the side thereof opposite motors 4, 5, is a flat rectangular member 25, substantially thicker than frame plate 1, made of a suitable low friction material, typically a synthetic resinous material having good slide bearing characteristics, such as the acetal resin derived from formaldehyde and supplied under the trademark Delrin by E. I. du Pont de Nemours & Co., Wilmington, Del., and the various nylons. Secured by screw 26, member 25 has its edge 27 lying in the same plane as the end of flange 2, and is provided with a pair of slots 28, 29, FIG. 4, which open through edge 30 and are each aligned longitudinally with a different one of plungers 8, 9 so that actuating member 19 extends through slot 28 and member 21 extends through slot 29. The width of slots 19, 21 is such that the side edges of each slot slidably engage the respective side faces of members 19, 21, respectively. The short edges 31, 32 of the slots slidably engage, respectively, the edges of members 19, 21 most distant from plate 1. A bar 33, of the same material as member 25, extends across both slots 28, 29 and is secured by screws 34 which extend through bar 33 and member 25 and are engaged in threaded bores in flange 2. Bar 33 is spaced from edges 31, 32 by a distance slightly greater than the width of members 19, 21 in a direction normal to surface 3, so that the edge 35 of bar 33 can slidably engage the edges of members 19, 21 which are nearer plate 1. The length of each member 19, 21 is such that, when windings 6, 7 are energized to move the plungers to their fully energized positions, the ends of members 19, 21 will still project beyond bar 33.

A flat rigid member 36 is supported on frame plate 1 by flange 2 and guide members or posts 37, 38, member 36 being parallel to surface 3 and spaced therefrom by a distance such as to be well beyond members 19, 21. Members 36, 37 and 38 are of the same material as member 25, and member 36 is rigidly secured to the end edge of flange 2 by a lug 39 which projects through a suitable opening in member 36 and is upset to clamp that member against the flange. Members 37, 38 are rigidly fixed to plate 1 and member 36 and extend at right angles to surface 3, each member 37, 38 being disposed at the side of one of the actuating members 19, 21 which is nearer the adjacent edge of plate 1.

Member 37 includes end portions 40, 41 and an intermediate portion 42, portion 42 being fully cylindrical and of smaller diameter while portions 40, 41 are cylindrical and of larger diameter, these portions being cut away to provide flat surfaces on the sides thereof nearer the adjacent edge of plate 1. Portion 42 directly engages the adjacent face of actuating member 19. The shoulders 43, 44, FIG. 8, at the junctures of portion 42 with portions 40, 41 respectively engage the two narrow edge surfaces of member 19. These shoulders combine with portion 42 to define a lateral notch through which member 19 slidably extends. Member 38 is identical to member 37, including enlarged end portions 45, 46, intermediate portion 47, and shoulders 48 and 49, actuating member 21 being slidably engaged in the lateral notch defined by shoulders 48, 49 and portion 47. The notches just referred to coact with the bearing openings defined respectively by slots 28, 29 and bar 33 to constrain actuating members 19, 21 to parallel paths of rectilinear motion parallel to surface 3.

Frame plate 1 and member 36 are provided with coaxially aligned circular bearing openings which define an axis of rotation which is at right angles to surface 3, centered between actuating members 19, 21, and located between solenoids 4, 5 and flange 2. A shaft 50 extends through these bearing openings, with one end portion 51 of the shaft projecting significantly beyond member 36 and the other end portion 52 projecting a substantial distance beyond plate 1. Shaft 50 has a key slot 53 extending the full length of the shaft. Secured to shaft 50 and provided with keys engaged in slot 53 are two ratchet wheels 54, 55 arranged side-by-side. Ratchet wheels 54, 55 are identical save that their teeth face in opposite direction. The axial dimension of the ratchet wheels is approximately equal to the width of members 19, 21, and the wheels are disposed in locations such that the end face of wheel 54 nearer plate 1 lies in the plane common to the edges of members 19, 21 nearer plate 1, while the end face of wheel 55 nearer member 36 lies in the plane common to the edges of members 19, 21 nearer member 36, the remaining end faces of the two wheels abutting each other.

Actuating member 19 is provided with integrally formed ears 56, 57, both being bent from the body of member 19 at the long edge thereof nearer plate 1. Ear 56 is located at the end portion of member 19 which is connected to clevis 13, and this ear projects laterally toward the adjacent edge of frame plate 1. Ear 57 is located nearer the other end of member 19 and projects toward member 21. Actuating member 21 has integrally formed ears 58, 59 bent from the edge of that member nearer member 36, ear 58 projecting toward the adjacent edge of plate 1 and ear 59 projecting toward member 19.

The sides of flange 2 are formed with retaining ears 60, 61, respectively, both ears being located outwardly of the respective actuating members 19, 21. A helical tension spring 62 has its hooked ends engaged respectively with ear 56 of member 19 and ear 60 of flange 2, spring 62 thus extending along beside member 19 and biasing that member toward flange 2 in opposition to the action of electromagnet 4 when the latter is energized. Ear 57 is rectangular and presents a straight edge 63 which is parallel to flange 2 and faces the same, so that spring 62 urges member 19 into a normal position in which edge 63 engages flange 2. Thus, ear 57 and flange 2 coact as stop means. A helical tension spring 64 has its hooked ends engaged respectively with ear 58 of member 21 and ear 61 of flange 2, the spring extending along beside member 21 and biasing the same against the operating force of motor 5. Ear 59 is rectangular and presents an abutment edge 65 for engagement with flange 2 to determine the normal position of member 21.

Mounted by pin 66 on ear 57, and located between ear 57 and member 36, is a pawl member 67. Pin 66 is fixed, being staked to ear 57, and the pawl member is journaled on the pin for pivotal movement about the axis defined by the pin and which is at right angles to surface 3. Pawl member 67 includes a hub 68 of such length as to substantially fill the space between ear 57 and the flanged head 69 of pin 66. The flat body 70 of the pawl member projects transversely of hub 68 and, in an area spaced from the hub, carries the integrally formed pawl element 71 and detent element 72. In the area of elements 71, 72, the flat body is substantially thicker than it is adjacent hub 68, so that a shoulder 73 is presented which faces the hub and is rounded in that portion of the shoulder adjacent element 71. A torsion spring 74 surrounds hub 68, one end of the spring being engaged in an aperture 74' in ear 57, the other end engaging the rounded portion of shoulder 73, so that spring 74 biases pawl member 67 pivotally in a direction tending to move element 71 away from member 19 and toward ratchet wheel 54.

Pawl member 75 is mounted on ear 59 of member 21 by pin 76 in the same fashion just described and includes hub 77, flat body 78, pawl element 79, detent element 80, and shoulder 81. Torsion spring 82 encircles hub 77 and has its ends engaged respectively in aperture 83 in ear 59 and with shoulder 81.

A post 84, with its ends secured to plate 1 and member 36, respectively, is provided in a position between shaft 50 and flange 2, being centered between members 19 and 21. Detent elements 72, 80, extending from edges of the respective pawl members which are leading edges with respect to movement of the pawls toward flange 2, are of such length that, as edges 63 and 65 of ears 57 and 59, respectively, near flange 2, detent elements 72, 80 come into engagement with post 84 and cause the pawl members to be pivoted slightly into initial, inactive positions in which elements 71 and 79 are spaced slightly from the respective ratchet wheels 54, 55.

Figures 9, 11:
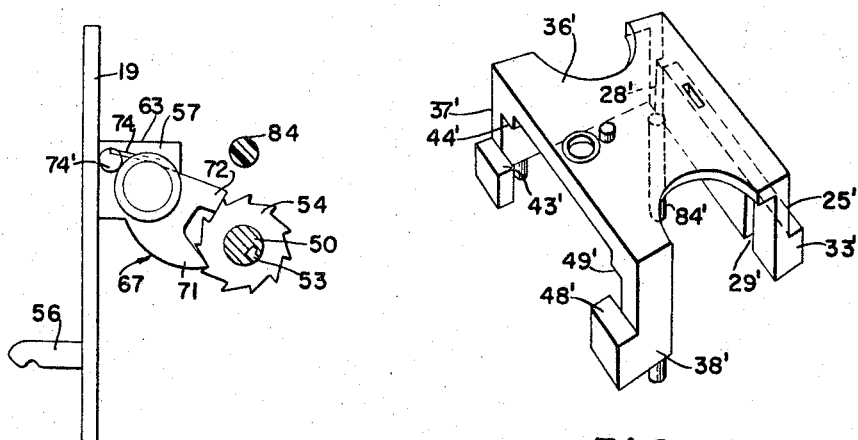
FIG. 9 is an enlarged fragmentary sectional view, with some parts thereof in elevation, taken on line 5—5 of FIG. 2 and illustrating one pawl member in engagement with a corresponding ratchet member.
FIG. 11 is a perspective view illustrating a modified form for a portion of the stepper switch.

When solenoid 4 is energized, so that actuating member 19 moves toward the solenoid, detent element 72 departs from post 84, allowing spring 74 to pivot pawl member 67 counter-clockwise, as viewed in FIG. 5. Since, at this time, the pawl member is very near ratchet wheel 54, the combined pivotal and rectilinear motions cause element 71 to engage one of the teeth of the ratchet wheel, and further movement of member 19 causes the pawl to rotate the ratchet wheel, and therefore shaft 50, until detent element 72 comes into flush engagement with the long side of one of the teeth of ratchet wheel 54, as seen in FIG. 9, so that further rotation of the ratchet wheel, and further movement of member 19 toward the solenoid, are prevented. When solenoid 4 is de-energized, spring 62 returns member 19 to its predetermined initial position, with edge 63 of ear 57 engaging flange 2. Energization of solenoid 5 similarly causes rotation of shaft 50, but in the opposite direction, through coaction of pawl member 75 with ratchet wheel 55.

Mounted on the side of frame plate 1 opposite surface 3, by mounting posts 85, is a rotary switch structure 86, FIGS. 2–4 and 6, including a fixed wafer 87 of insulating material disposed parallel to and spaced from plate 1. Wafer 87 has a circular central opening having a diameter several times larger than that of shaft 50, and end portion 52 of the shaft projects through this opening and beyond the wafer. The movable contact assembly 88, FIGS. 3 and 6, comprising an insulating disc 89 and contact rings 90, 91, is rotatably mounted in the central opening of wafer 87 and is connected to end portion 52 of shaft 50 for rotation therewith. Typically, disc 89 has a rectangular opening which embraces a rectangular hub member 92 provided with a key engaged in slot 53. Contact ring 90 is adjacent and parallel to the side of wafer 87 opposite plate 1, and has a radially projecting thin contact blade 93. On this side of wafer 87 are mounted ten fixed contacts 94, one of which is seen in detail in FIG. 10, each contact 94 comprising a tongue 95, which lies in engagement with wafer 87, and a second tongue 96 which is disposed on the side of tongue 95 opposite the wafer. Tongues 95, 96 are formed as ends of a single resilient metal strip bent upon itself at 97 and secured to wafer 87 by a rivet 98, the configuration of the end of the strip forming tongue 96 being such that tongue 96 is normally urged resiliently against tongue 95. When shaft 50 is turned, blade 93 is forced between the tongues 95, 96 of each contact 94 in succession.

The design of the pawl and ratchet mechanism and of the rotary contact structure is such that, when one of the actuating members 19, 21 is moved through a full stroke as a result of energization of one of the solenoids, the movable contact assembly is turned through an angular distance such as to move blade 93 from a position centered between the tongues 95, 96 of one contact 94 to a position centered between the tongues of the next successive contact 94.

Contact ring 91 is adjacent and parallel to the side of wafer 87 nearer plate 1 and is engaged between the tongues 99 of a fixed contact 100 carried by wafer 87.

Rings 90 and 91 are electrically interconnected. Hence, for any operational position of the device, contact 100 is connected to one of the contacts 94.

At a point between plate 1 and wafer 87, there is fixed to shaft 50 a cam finger 101 made of suitable insulating material and disposed to enter between the normally closed contact fingers 102, 103 of a switch 104 secured to plate 1. Thus, rotation of shaft 50 not only causes successive connection of contact 100 to contacts 94 but also serves to open switch 104 at one particular rotational position of the shaft.

In order to provide predetermined "start" and "stop" positions for the stepping mechanism, a stop pin 105 is provided, being secured to the side of member 36 opposite plate 1 in a location adjacent shaft 50. A radial arm 106 is secured to end portion 51 of the shaft and is of such length as to engage pin 105 laterally as the shaft is rotated. In the embodiment illustrated, pin 105 is of such diameter and so located that, when arm 106 is engaged with the left side of pin 105, as viewed in FIG. 1, eight successive actuations of the pawl and ratchet mechanism by solenoid 4 will result in engagement of the arm with the right side of the pin, as viewed, further stepping by solenoid 4 then being precluded, and eight successive actuations by solenoid 5 being required to return the mechanism to its initial position. In this embodiment, arm 106 and cam finger 101 are so oriented that finger 101 opens switch 104 when, after eight successive operations of solenoid 5, arm 106 engages the left side of pin 105, as viewed in FIG. 1.

Figure 4:
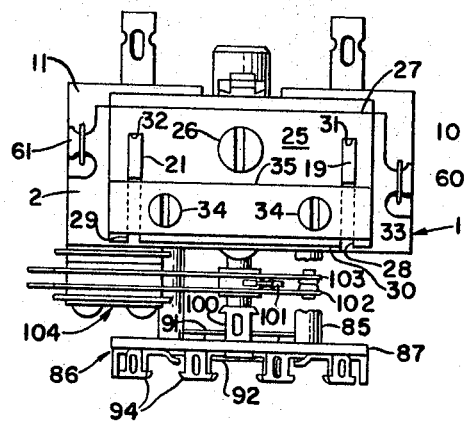

Rather than making elements 25, 33 and 36–38 separately, it is advantageous to employ a single molding in which these elements are all integral parts of the molded piece. One such integral molding is illustrated in FIG. 11, and includes flat portion 36' from one edge of which portion 25', having slots 28', 29' depends. Bar 33, FIG. 4, is replaced by portion 33', integral with portion 25'. Dependent leg portions 37', 38' correspond to posts 37, 38, FIGS. 5 and 8, and are provided with shoulders 43', 44' and 48', 49', respectively, to guide actuating members 19, 21. Leg portions 37', 38' terminate in projections to extend through apertures in plate 1 for securing the molded piece to the plate. Post 84" depends from portion 36', being integral therewith, and having a flat end face to engage surface 3 of the frame plate.

Figure 12:
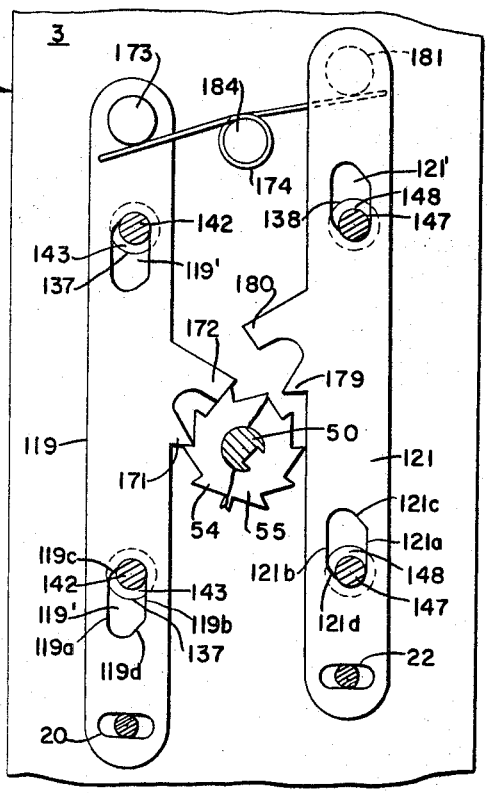
FIG. 12 is an elevational view of another form of pawl and ratchet means in accordance with the invention.

FIG. 12 illustrates a modified form of pawl and ratchet mechanism which can be used in the relay of FIGS. 1–10, and in which the pawls are integral with the actuating members. Here, actuating members 119, 121 are flat metal bars lying in separate planes spaced from and parallel to surface 3 of frame plate 1. The two actuating members are spaced apart and extend parallel to each other, with ratchel wheels 54, 55 centered between the two members. Member 119 has a pawl element 171 and a detent element 172 formed integrally therewith and projecting from the appropriate edge of the member for engagement with ratchet wheel 54. Member 121 is similarly provided with a pawl element 179 and a detent element 180, both formed integrally with member 121 and projecting from one edge thereof for engagement with ratchet wheel 55. Elements 171 and 172 lie in the same plane as the body of member 119. Elements 179 and 180 lie in the same plane as the body of member 121.

At its end nearest solenoid 4, member 119 has an opening which is elongated transversely of the member and through which pin 20 of clevis 13 extends. Similarly, member 121 has a transversely elongated opening through which pin 22 of clevis 14 extends. Member 119 is supported for generally rectilinear movement, lengthwise thereof, by shoulders 143 on guide pins 137 fixed to plate 1, the two guide pins having cylindrical portions 142 extending each through a different one of two identical longitudinally spaced openings 119' in member 119. Openings 119' and the portions 142 of pins 137 coact to serve both as limit stop means and as cam means for shifting member 119 laterally toward and away from ratchet wheel 54 as the actuating member is moved longitudinally. Each opening 119' has parallel sides 119a and 119b which extend longitudinally of member 119 and are substantially longer than the diameter of guide pin portions 142. The end edges 119c and 119d of each opening are parallel to each other but extend angularly across member 119, slanting toward member 121 and away from the solenoids. Edge 119c joins edge 119b in an arcuate corner of the same diameter as guide pin portion 142. Edge 119d joins edge 119a in a similar arcuate corner.

Member 121 has longitudinally spaced openings 119' save that the end edges 121c and 121d slant in the opposite direction from edges 119c and 119d. Thus, the end edges of openings 119' and 121' can be said to converge away from the solenoids. Member 121 is supported by guide pins 138 fixed to plate 1 and having supporting shoulders 148 engaging the side of member 121 nearer plate 1. Each guide pin 138 has a cylindrical portion 147 which projects through the corresponding opening 121'.

At its end opposite the solenoids, member 119 is provided with a boss 173 which projects toward plate 1. Similarly, member 121 has a boss 181 projecting away from plate 1. A post 184 is secured to plate 1 at a point centered between those end portions of members 119, 121 most distant from the solenoids. A helical torsion spring 174 surrounds post 184, the ends of the spring being respectively engaged with bosses 173 and 181 on the sides thereof nearer the solenoids. Accordingly, with neither solenoid energized, spring 174 urges members 119, 121 to initial positions determined by engagement of the guide pin portions 142, 147 with the respective circular corners joining edges 119a and 119d, for member 119, and 121a and 121d, for member 121. Because of their angular disposition, edges 119d and 121d, when engaging guide pin portions 142 and 147, respectively, have a camming action which shifts members 119 and 121 laterally toward each other, so that the pawl elements 171 and 179 are in proper initial positions relative to ratchet wheels 54, 55, respectively. When solenoid 4 is energized, actuating the member 119 downwardly, as viewed in FIG. 12, guide pin portions 142 engage edges 119c, so that member 119 is shifted laterally away from ratchet wheel 54 in such fashion that pawl element 171 follows the arcuate path necessary for proper operating engagement with the ratchet teeth, the guide pin portions ultimately engaging in the arcuate junctions between edges 119b and 119c when the detent element 172 is properly engaged with the ratchet. A similar lateral motion is imparted to member 121 by camming engagement between edges 121c and the intermediate guide pin portions 147. Upon de-energization of solenoid 4, spring 174 returns member 119 to its initial position.

The pawl and ratchet mechanism of FIG. 12 has several advantages, including particularly the fact that the pawl and detent elements are integral with the actuating members, and the ability to use the guide pins 137, 138 serve both as support means for the actuating members and, in cooperation with openings 119', 121', as stop means effective to limit rectilinear motion of the actuating arms in both directions. Further, in this embodiment, the single spring 174 serves to bias both actuating members to their initial positions.

What is claimed is:
1. In a bi-directional stepping relay, the combination of
    frame means;
    two electromagnetic motor devices each comprising
        an electromagnet,
        an actuating member,
        means mounting said actuating member on said frame means for generally rectilinear motion, and resilient means operatively associated with said actuating member for biasing the same in one direction, energization of said electromagnet moving said actuating member in the other direction, said motor devices being mounted on said frame means with said actuating members spaced apart and the paths of rectilinear motion thereof mutually parallel;

a shaft mounted on said frame means for rotary movement about an axis disposed between and extending transversely of said paths of travel;

ratchet wheel means secured to said shaft and comprising two sets of ratchet teeth arranged with the teeth of one set facing in the opposite direction from the teeth of the other set;

two pawls each carried by a different one of said actuating members, each of said pawls being operatively arranged to coact with a different one of said sets of ratchet teeth; and stop means including cooperating abutment members carried by said frame means and said actuating members to positively limit movement of said actuating members in said one direction.

2. A stepping relay according to claim 1, wherein each of said actuating members comprises an elongated rectangular metal arm having a mounting ear bent therefrom, said pawls are each mounted on a different one of said ears for pivotal movement about an axis parallel to said shaft, and each of said ears constitutes one of the abutment members of said stop means.

3. A stepping relay according to claim 2, wherein said frame means comprises a flat plate having a flange projecting at right angles thereto, said flange being located on the same side of said plate as are said actuating members and having a pair of spaced openings each aligned with a different one of said paths, said arms extending freely through said openings, and said flange constituting one of the abutment members of said stop means.

4. A stepping relay according to claim 1, wherein each of said pawls includes a stop element disposed to engage the corresponding set of said ratchet teeth to prevent further rotation of said shaft when the one of said actuating members carrying that pawl has reached the end of its travel in a direction to move said ratchet wheel means, the relay further comprising a stationary member carried by said frame means in a position to be engaged by both of said stop elements whenever said actuating members are respectively stopped by said stop means, engagement of either of said stop elements with said stationary member causing the corresponding one of said pawls to be pivoted away from said ratchet wheel means, movement of either of said actuating members in said one direction, as a result of energization of the corresponding one of said electromagnets, causing the one of said pawls carried by the actuating member to engage and rotationally advance said ratchet wheel means.

5. A stepping relay according to claim 1, wherein said frame means comprises a flat plate having a flange projecting from one side thereof, said flange having two spaced openings;

said electromagnets are mounted on said one side of said plate and spaced from said flange, said actuating members being elongated and projecting freely, each through a different one of said openings;

the relay further comprising a member of low friction material secured to said flange, on the side thereof opposite said electromagnets, and including two slide bearing openings each embracing a different one of said actuating members.

6. A stepping relay according to claim 1 and further comprising a member of low friction material secured to said frame means and extending transversely of said paths of travel in a location spaced from said elemtromagnets, said member of low friction material having two slide bearing openings each embracing a different one of said actuating members, and two posts of low friction material fixed to said frame means and each disposed beside a different one of said actuating members in a location between the corresponding one of said slide bearing openings and the corresponding one of said electromagnets, each of said posts having a lateral bearing notch and the adjacent one of said actuating members being slidably engaged in said notch.

7. A stepping relay according to claim 1, wherein said frame means comprises a flat plate, said motor devices being mounted on one side of said plate, and said shaft extending through said plate with said ratchet wheel means being disposed on the same side of said plate as are said motor devices, the relay further comprising switch means located on the other side of said plate and including a set of stationary contacts located on the other side of said plate and mounted thereon, said stationary contacts being arranged in a circularly spaced series concentric with said shaft and lying in a plane transverse thereto, and a rotary contact structure connected to said shaft for rotation therewith, each of said stationary contacts having two contact portions urged resiliently together, said rotary contact structure including a contact blade arranged to enter between the two contact portions of each of said stationary contacts in succession as said shaft is turned, said motor devices, said pawls and said ratchet means being so constructed and arranged that each actuation of said ratchet wheel means resulting from energization of one of said motor devices will turn said shaft from a first position, in which said contact blade is disposed between the contact portions of one of said stationary contacts, to a second position, in which said contact blade is disposed between the contact portions of the next adjacent one of said stationary contacts.

8. A stepping relay according to claim 1, wherein said frame means comprises a flat plate;

said motor devices each include a solenoid and a plunger, said motor devices being mounted in side-by-side relation on one side of said plate with said plungers parallel to said plate and to each other;

each of said actuating members comprises a flat elongated rectangular metal member lying in a plane at right angles to said plate, said rectangular members each being longitudinally aligned with a different one of said plungers, each of said rectangular members having a first edge adjacent said plate and a second edge spaced from said plate, one of said rectangular members having a mounting ear projecting from said first edge thereof parallel to said plate and toward the other of said rectangular members, said other rectangular members having a mounting ear projecting from said second edge thereof parallel to said plate and toward said one rectangular member;

said sets of ratchet teeth being disposed between the parallel planes occupied by said mounting ears;

one of said pawls being pivotally carried by the mounting ear of said one rectangular member on the side thereof opposite said plate;

the other of said pawls being pivotally carried by the mounting ear of said other rectangular member on the side thereof adjacent said plate.

9. A stepping relay according to claim 8, wherein said plate is provided with a flange projecting from said one side thereof and across the paths of travel of said rectangular members, said flange being spaced from said electromagnets and having opening means through which said rectangular members freely extend, the relay further comprising a member of non-metallic low friction material secured to said flange and provided with two slide bearing openings each slidably embracing a different one of said rectangular members.

10. A stepping relay according to claim 9, wherein said non-metallic member is secured to the side of said flange which is directed away from said electromagnets, said mounting ears are located between said flange and said electromagnets and each include an edge portion directed toward said flange, each of said rectangular members includes a retaining ear projecting laterally therefrom and away from the other of said rectangular members, said resilient means of each of said motor devices is a tension spring extending longitudinally beside the corresponding one of said rectangular members and having its ends connected respectively to said flange and said retaining ear of the rectangular member, said springs normally retaining said edge portions of said mounting ears in engagement with said flange.

11. A stepping relay according to claim 10 and further comprising a first guide member secured to said plate and projecting therefrom between one of said rectangular members and the one of said springs associated therewith, and a second guide member secured to said plate and projecting therefrom between the other of said rectangular members and the one of said springs associated therewith, each of said guide members being of non-metallic low friction material and having a lateral notch in which the corresponding one of said rectangular members is slidably disposed.

12. A stepping relay according to claim 11 and further comprising a flat member spaced from and parallel to said plate, said flat member being secured to said guide members, said shaft being journaled in said plate and in said flat member.

13. A stepping relay according to claim 12, wherein said flat member is provided with an abutment adjacent said shaft, the relay further comprising a limit member carried by said shaft for rotation therewith and so located and dimensioned as to come into engagement with said abutment of said flat member when said shaft is rotated in either direction.

14. A stepping relay according to claim 12, wherein said flat member extends to said flange and is secured thereto, the relay further comprising a post located between said shaft and said flange and having its ends secured respectively to said plate and said flat member, each of said pawls having a portion adapted to engage said post and cause the pawl to pivot away from said ratchet wheel means as the one of said mounting ears carrying the pawl approaches engagement with said flange.

15. A stepping relay according to claim 1, wherein each of said actuating members is a flat elongated arm, said arms lying in spaced parallel planes which are at right angles to said shaft, and each such plane passing through a different one of said sets of ratchet teeth, and each of said pawls is formed integrally with a different one of said arms.

16. A stepping relay according to claim 1, wherein each of said actuating members is a flat elongated arm, said arms lying in spaced parallel planes which are at right angles to said shaft and which each pass through a different one of said sets of ratchet teeth, and each of said pawls is rigidly carried by a different one of said arms, the relay further comprising two guide members fixedly carried by said frame means, each of said arms having an opening, said guide members projecting through said openings, said openings each having edge portions engaged by the corresponding one of said guide members, during longitudinal movement of the arm, said edge portions and guide members coacting as cam means operative to shift the arm laterally relative to said ratchet wheel means to allow said rigidly carried pawls to operatively engage the ratchet teeth.

17. A stepping relay according to claim 1, wherein said resilient means for biasing said actuating members comprises a torsion spring carried by said frame means in a position centered between the paths of rectilinear motion of said actuating members, each end of said torsion spring being operatively engaged with a different one of said actuating members.

18. A stepping switch according to claim 1, wherein each of said actuating members is provided with an opening, and said stop means comprises members carried by said frame means and each projecting through one of said openings.

References Cited

UNITED STATES PATENTS 1,828,113  10/1931  Howard _____ 335—123

FOREIGN PATENTS 838,622  5/1952  Germany.

BERNARD A. GILHEANY, *Primary Examiner.*

R. N. ENVALL, JR., *Assistant Examiner.*